UNITED STATES PATENT OFFICE.

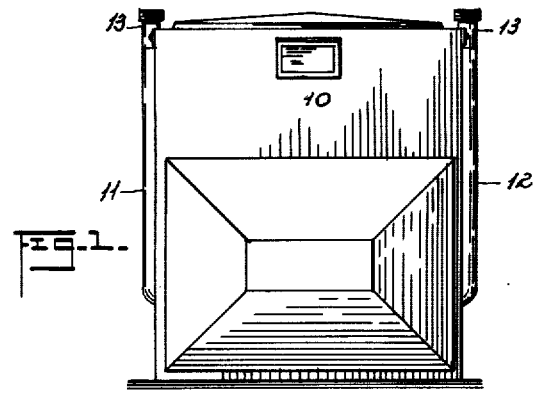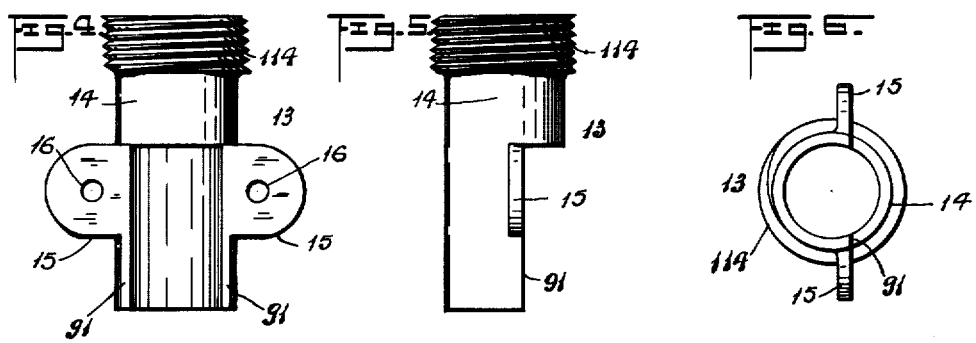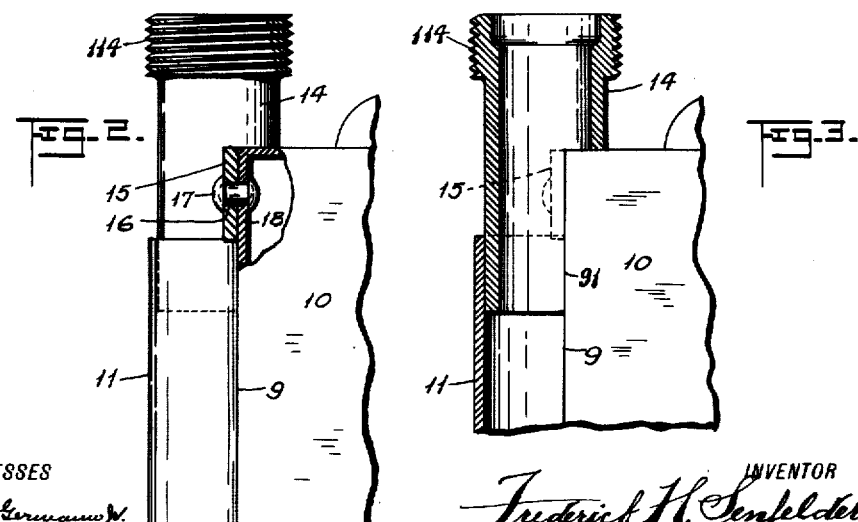

FREDERICK H. SENFELDER, OF IRVINGTON, NEW JERSEY.

GAS-METER CONNECTION.

932,816.

Specification of Letters Patent.   Patented Aug. 31, 1909.

Application filed May 22, 1909. Serial No. 497,596.

*To all whom it may concern:*

Be it known that I, FREDERICK H. SENFELDER, a citizen of the United States, residing at Irvington, in the county of Essex and State of New Jersey, have invented certain Improvements in Gas-Meter Connections, of which the following is a specification.

The objects of this invention are to provide for gas meters a pipe connection which shall be not only tight and impervious to leakage, but also strong and abundantly able to resist the strain of coupling and uncoupling the service and supply pipes; to enable the connection to be attached to and supported by the body of the gas meter, and not by the inlet and outlet tubes thereof; to thus remove strain from said inlet and outlet tubes of the meter; to secure a simple and inexpensive connection, which can be readily applied to a meter in impervious relation to the inlet and outlet tubes thereof, and to obtain other advantages and results as may be brought out in the following description.

Referring to the accompanying drawings, in which like numerals of reference indicate corresponding parts in each of the several figures, Figure 1 is a front elevation of a gas meter provided with pipe connections of my improved construction; Fig. 2 is a side view of one of the connections, on larger scale, partly in section through one of its holding rivets; Fig. 3 shows the pipe connection and inlet pipe in central section on a plane perpendicular to the meter; Fig. 4 is a view of the pipe connection detached, looking at its face adapted to be applied to the meter; Fig. 5 is a side view of the pipe connection detached, and Fig. 6 is an end view of the connection, looking at its lower end.

In said drawings, 10 indicates a gas meter of usual form having at its opposite sides inlet and outlet tubes 11, 12, respectively. These tubes are of sheet metal, as usual, cut away or open at one side and soldered to the outside of the meter by the longitudinal edges 9 thus formed. The tops of the said inlet and outlet tubes, in my improved construction, terminate somewhat below the top of the gas meter, as shown in Figs. 1, 2 and 3.
Into the upper end of each of said inlet and outlet tubes 11 and 12 is inserted the correspondingly shaped lower end of one of my improved connections 13, the upper part of the connection being cylindrical, as at 14, and hooking over the top of the gas meter. The extreme upper end of the connection is exteriorly threaded, as at 114, to receive the coupling of the service or supply pipes (not shown).

The entire connection 13 is one piece or casting, and at its opposite sides are ears 15, 15, flush with the edges 91 of the cut-away lower part of the connection and adapted to lie flat against the side of the meter 10. These ears have holes 16, through which rivets 17 are passed into the wall 18 of the meter, whereby the connection is solidly secured to said wall. The joint made by the edges of the connection with the outside of the meter, and the telescopic joint of the connection with the inlet or outlet tube, are then imperviously soldered.

It will be noted that my improved connection is supported by the rivets 17, so that no strain comes upon the soldered attachment of said connection to the meter and inlet and outlet pipes thereof. Coupling and uncoupling of street and house pipes to said connections will therefore have no effect to loosen them from the meter and cause leakage, but a connection is provided which by its firmness and solidity will remain tight or impervious.

Having thus described the invention, what I claim is:

1. The combination with a meter body and a tube on the side of said body terminating short of the top edge thereof, of a connection adapted at one end to connect with said tube and at its other end to project from the meter body, and means attaching said connection between its said ends to the meter body.

2. The combination with a meter body and a tube on the side of said meter body terminating short of the top edge thereof, of a connection adapted at one end to connect with said tube and to project at its other end from the meter body, ears on opposite sides of said connection between its said ends adapted to lie against the meter body, and means securing said ears to said body.

3. The combination with a meter body and a tube on the side of said body terminating short of the top edge thereof and being cut away at its side next to said body, of a connection having a similarly cut away end portion telescopically connecting with said tube and an entire cylindrical opposite end portion hooking over the top edge of the meter body and projecting therebeyond, and means attaching said connection between its ends to the meter body.

4. The combination with a meter body and a tube on the side of said body terminating short of the top edge thereof and being cut away at its side next to said body, of a connection having a similarly cut away end portion telescopically connecting with said tube and an entire cylindrical opposite end portion hooking over the top edge of the meter body and projecting therebeyond, ears on opposite sides of said connection between its ends adapted to lie against the meter body, and means securing said ears to said body.

5. The combination with a meter body and a tube on the side of said body terminating short of the top edge thereof and being cut away at its side next to said body, of a connection having a similarly cut away end portion telescopically connecting with said tube and an entire cylindrical opposite end portion hooking over the top edge of the meter body and projecting therebeyond, ears projecting from the edges of said cut away end portion adjacent to the cylindrical portion and lying flatwise against the meter body, and rivets through said ears and body wall.

6. A pipe connection for gas meters, comprising a tubular body portion having coupling means at one end and being laterally open or cutaway adjacent to its other end, and attaching ears projecting from opposite sides of said body portion intermediate of its ends.

7. A pipe connection for gas meters, comprising a tubular body portion having coupling means at one end and being laterally open or cutaway on a chordal plane adjacent to its other end, said cutaway portion ending at an abrupt shoulder in a transverse plane of the connection, and ears projecting from the edges of the body portion adjacent to said shoulder and in substantially the same plane with said edges.

FREDERICK H. SENFELDER.

In the presence of—
RUSSELL M. EVERETT,
FRANCES E. BLODGETT.